US009854020B1

(12) United States Patent
Kum et al.

(10) Patent No.: US 9,854,020 B1
(45) Date of Patent: Dec. 26, 2017

(54) BITRATE SELECTION FOR VIDEO STREAMING

(71) Applicant: Google Inc., Mountain View, CA (US)

(72) Inventors: Sang-Uok Kum, Sunnyvale, CA (US); Sam John, Fremont, CA (US); Thierry Foucu, San Jose, CA (US); Lei Yang, Palo Alto, CA (US); Alexander Jay Converse, San Jose, CA (US); Steve Benting, San Mateo, CA (US)

(73) Assignee: GOOGLE INC., Mountain View, CA (US)

( * ) Notice: Subject to any disclaimer, the term of this patent is extended or adjusted under 35 U.S.C. 154(b) by 307 days.

(21) Appl. No.: 14/622,292

(22) Filed: Feb. 13, 2015

Related U.S. Application Data

(60) Provisional application No. 61/939,908, filed on Feb. 14, 2014.

(51) Int. Cl.
| | |
|---|---|
| *H04N 7/167* | (2011.01) |
| *H04N 7/12* | (2006.01) |
| *H04L 29/06* | (2006.01) |
| *H04N 21/234* | (2011.01) |
| *H04N 21/2343* | (2011.01) |
| *H04N 21/2385* | (2011.01) |
| *H04N 21/2662* | (2011.01) |
| *H04N 21/845* | (2011.01) |

(52) U.S. Cl.
CPC ........ *H04L 65/604* (2013.01); *H04L 65/4076* (2013.01); *H04N 21/2385* (2013.01); *H04N 21/23418* (2013.01); *H04N 21/23439* (2013.01); *H04N 21/2662* (2013.01); *H04N 21/8456* (2013.01)

(58) Field of Classification Search
CPC ...... H04L 65/604; H04N 7/167; H04W 72/04
See application file for complete search history.

(56) References Cited

U.S. PATENT DOCUMENTS

| | | | |
|---|---|---|---|
| 6,580,754 B1 * | 6/2003 | Wan ............... | H04N 21/234327 375/240.01 |
| 8,683,542 B1 * | 3/2014 | Henry .................. | H04L 1/0026 370/358 |
| 2012/0008525 A1 * | 1/2012 | Koskinen .............. | H04W 28/22 370/253 |

OTHER PUBLICATIONS

Information Technology—Dynamic adaptive streaming over HTTP (DASH)—Part 3: Implementation Guidelines/AMD1: Alignment with ISO/IEC 23009-1:2014 and extensibility; ISO/IEC; Jan. 24, 2014; 10 pgs.

* cited by examiner

*Primary Examiner* — Sath V Perungavoor
*Assistant Examiner* — Patricia I Young
(74) *Attorney, Agent, or Firm* — Lowenstein Sandler LLP

(57) ABSTRACT

A plurality of videos associated with a plurality of video resolutions may be received. A minimum bitrate may be identified for each of the video resolutions based on a first bitrate point associated with the videos where a quality of the videos at a first video resolution that is upscaled to a second video resolution is better than a quality of the videos at the second video resolution at bitrates below the first bitrate point. Furthermore, a maximum bitrate may be identified for each of the video resolutions based on a second bitrate point where the rate of change of the quality of the videos is below a threshold value. The identified minimum bitrates and the maximum bitrates may be assigned to the video resolutions.

20 Claims, 11 Drawing Sheets

BITRATE SELECTION FOR VIDEO STREAMING

RELATED APPLICATION

This application claims the benefit under 35 U.S.C. §119 (e) of U.S. Provisional Application 61/939,908 filed on Feb. 14, 2014.

TECHNICAL FIELD

This disclosure relates to the field of video streaming and, in particular, to bitrate selection for video streaming.

BACKGROUND

The streaming of multimedia (e.g., videos) to a client over a network may be based on adaptive bitrate streaming. For example, bandwidth and processing capability of the client may be detected in real time. In response to a change of the detected bandwidth and processing capability, the video stream accessed by the client may be adjusted accordingly. As an example, a video may be encoded at different bitrates. The client may switch from a first encoding of the video to a second encoding of the video in response to the changing resources or capabilities of the client.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method to receive a plurality of videos associated with a plurality of video resolutions and to identify a minimum bitrate for each of the video resolutions based on a first bitrate point associated with the videos where a quality of the videos at a first video resolution that is upscaled to a second video resolution is better than a quality of the videos at the second video resolution at bitrates below the first bitrate point. The method may further identify a maximum bitrate for each of the video resolutions based on a second bitrate point where the rate of change of the quality of the videos is below a threshold value and may assign the identified minimum bitrates and the maximum bitrates to the video resolutions.

In some embodiments, the identifying of the minimum bitrate for each of the video resolutions may be further based on a cumulative distribution associated with the first bitrate point of each of the videos. Furthermore, the identifying of the maximum bitrate for each of the video resolutions may be further based on a cumulative distribution associated with the threshold value of each of the videos.

In some embodiments, the method may further receive a request for one of the videos from a client device. The method may additionally identify an achievable bitrate associated with the client device and transmit a transcoding of the requested video based on the achievable bitrate of the client device and the minimum bitrate and maximum bitrate for one of the video resolutions.

In some embodiments, the achievable bitrate of the client device may be between the minimum bitrate and the maximum bitrate for the one of the video resolutions and the achievable bitrate may be based on video processing and bandwidth capabilities associated with the client device.

In some embodiments, the transmitting of the requested video based on the achievable bitrate of the client device and the minimum bitrate and the maximum bitrate for one of the video resolutions comprises identifying the transcoding of the requested video at a particular video resolution associated with the minimum bitrate and the maximum bitrate.

In some embodiments, the method may further identify a change in the achievable bitrate associated with the client device and may switch the transmitting of the requested video from the transcoding to a second transcoding based on the change in the achievable bitrate of the client device.

In some embodiments, the transcoding of the requested video may be at a first bitrate and a first video resolution and the second transcoding of the requested video may be at a second bitrate and a second video resolution. Furthermore, the first bitrate may be different than the second bitrate and the first video resolution may be different than the second video resolution.

In some embodiments, a non-transitory machine-readable storage medium storing instructions may be executed to cause a processing device to perform operations such as receiving a plurality of videos associated with a plurality of video resolutions identifying a minimum bitrate for each of the video resolutions based on a first bitrate point associated with the videos where a quality of the videos at a first video resolution that is upscaled to a second video resolution is better than a quality of the videos at the second video resolution at bitrates below the first bitrate point. The operations may further identify a maximum bitrate for each of the video resolutions based on a second bitrate point where the rate of change of the quality of the videos is below a threshold value and may also assign the identified minimum bitrates and the maximum bitrates to the video resolutions.

In some embodiments, a system may include a memory and a processor coupled to the memory. The processor may identify a plurality of videos and identify a plurality of target video resolutions associated with the videos. The processor may further identify a minimum bitrate for each of the target video resolutions based on a crossover point associated with the videos. The crossover point may be defined by a bitrate value where a quality of the videos at a first target video resolution that is upscaled to a second target video resolution is improved over a quality of the videos at the second target video resolution at bitrates below the bitrate value that defines the crossover point. Furthermore, the processor may identify a maximum bitrate for each of the target video resolutions based on a point of diminishing return that may be defined by a second bitrate value where a rate of change of improving quality of the videos is below a threshold value. The processor may further assign the identified minimum bitrates and the maximum bitrates to the target video resolutions.

BRIEF DESCRIPTION OF THE DRAWINGS

The present disclosure is illustrated by way of example, and not by way of limitation, in the figures of the accompanying drawings.

DETAILED DESCRIPTION

Adaptive bitrate streaming may be used to stream multimedia (e.g., a video) from a server to a client system over a network. The resolution and quality of a video received from the server over the network may be adjusted based on central processing unit (CPU) capabilities of the client system and bandwidth capabilities of the network used by the client system. For example, a video player of the client system may switch from a first format or encoding of a video to a second format or encoding of the video of a different quality in response to changing conditions (e.g., CPU, network bandwidth, etc.) associated with the client system.

The switching between quality levels or formats of a video may require a video to be transcoded into multiple resolutions (e.g., 1080p, 720p, 480p, 360p, etc.). Furthermore, each resolution of the video may need to be encoded at a particular bitrate. In some embodiments, a bitrate may refer to an amount of information or data stored in the video. The higher the bitrate, the more clear or higher quality the video may be to a viewer in general. However, as discussed in further detail below, if a bitrate associated with the capabilities of a client system is low, it may be beneficial to provide or stream a video to the client system at a lower resolution and upscale the lower resolution of the video to a higher resolution at the client system. For example, if a bitrate associated with a client system for a requested resolution (e.g., 720p) is too low, the quality of upscaling a lower resolution (e.g., 480p) to the higher resolution of 720p may result in a better quality than the video at the higher resolution (e.g., 720p) at the same bitrate.

As previously discussed, multiple resolutions of a video may be transcoded into multiple bitrates. A server may further be associated with thousands of videos to be delivered or streamed to a client system. Accordingly, a minimum bitrate and a maximum bitrate for each available resolution may need to be determined to be used for all of the videos streamed by the server, as opposed to individually determining a minimum bitrate and a maximum bitrate on a per video basis. As such, a strategy or technique for quantitatively selecting or determining the minimum bitrate and maximum bitrate for each resolution for the videos video may be needed. Such a strategy or technique may be based on a rate distortion theory, as described in further detail below, which may be used to determine the theoretical minimum and maximum bounds for the bitrates needed to send data (e.g., video segments) over a network. The quantitative selection of the minimum bitrates and the maximum bitrates may ensure that the quality of a video does not decrease as the target bitrate is increased and may further ensure that the minimum and maximum bitrates of target resolutions do not overlap.

Figure 1:
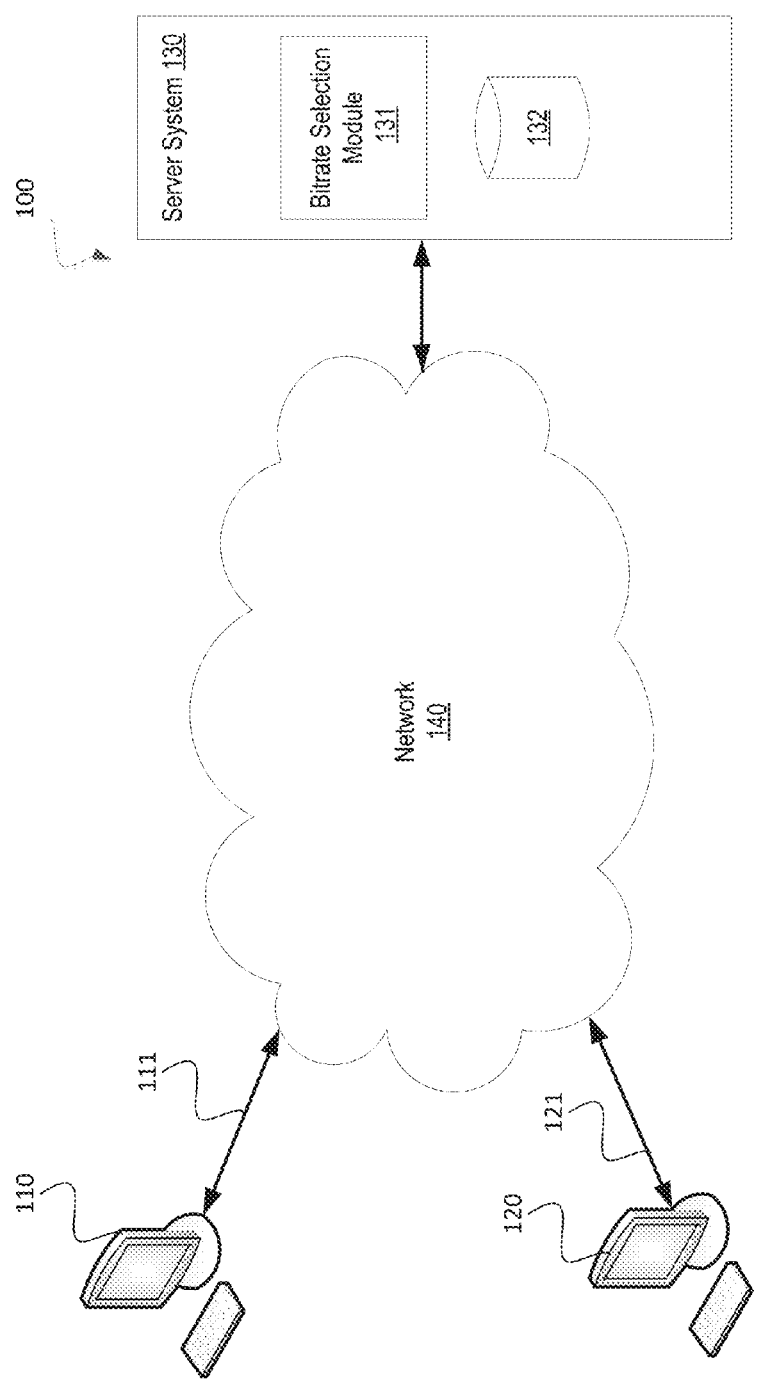
FIG. 1 illustrates an example system architecture in which embodiments of the present disclosure may operate.

FIG. 1 illustrates an example system architecture 100 in which embodiments of the present disclosure may operate. In general, the system architecture 100 may include client devices 110 and 120 that may request data, such as a video, from a server system 130 over a network 140. The network 140 may be a public network, a private network, a wireless network, a cellular network, or a combination thereof.

The server system 130 may manage or store data in a storage device 132. The data may include digital multimedia such as videos. Furthermore, the client devices 110 and 120 may each be a computing device such as a desktop computer, laptop computer, or a portable computing device such as, but not limited to, mobile telephones, personal digital assistants (PDAs), portable media players, netbooks, tablet computers, portable gaming consoles, portable televisions, electronic book readers, and the like. In some embodiments, each of the client devices 110 and 120 may include a type of media player for playing a type of digital media (e.g., a video).

As an example, users of the client devices 110 and 120 may each transmit a request to the server system 130 over the network 140 for one or more videos stored at the storage device 132. In some embodiments, the videos may be stored at the storage device 132 in segments based on a resolution for each video and one or more bitrates for each resolution of each video. For example, a source video may be transcoded into multiple bitrates and each transcoded video may be temporally divided into multiple smaller segments. Each of the segments may be encoded to be independent. For example, each segment of a video may be decoded separately for video playback. Furthermore, each of the transcoded videos that have been divided into segments may be associated with the same segment boundaries (e.g., time boundaries) to enable switching between different bitrates and/or resolutions at the segment boundaries. Thus, the storage device 132 may store multiple videos where each video is divided into multiple segments. In some embodiments, the storage device 132 may further include a manifest file that may be transmitted by the server system 130 to the client devices 110 and 120. In some embodiments, the manifest file may identify the available representations of the video (e.g., the available resolutions at available bitrates) and the segment boundaries for each segment of the video. The manifest file may be transmitted by the server system 130 in response to a request for the streaming of a video in the storage device 132 by the client devices 110 or 120. Each of the client devices 110 and 120 may use the manifest file to switch between different bitrate streams from the server system 130 based on the available resources (e.g., CPU and bandwidth) of the respective client device 110 or 120. For example, a first bitrate stream of a video may be transmitted from the server system 130 to the client device 110 based on the CPU capabilities of the client device 110 and the network path 111 associated with the client device 110. Furthermore, a second bitrate stream of the same video may be transmitted from the server system 130 to the client device 120 based on the CPU capabilities of the client device 120 and the network path 121 associated with the client device 120.

As shown in FIG. 1, the server system 130 may include a bitrate selection module 131. In some embodiments, the bitrate selection module 131 may determine or calculate a minimum bitrate and a maximum bitrate for multiple resolutions of multiple videos. For example, the bitrate selection module 131 may determine or calculate the minimum bitrate and the maximum bitrate. The representations of the video based on the bitrates and resolutions may be provided to client devices 110 and 120 so that the client devices 110 and 120 may switch between the video representations based on the achievable bitrate of the client devices 110 and 120 and the determined minimum and maximum bitrates for the resolutions of the videos.

Although the system architecture 100 of FIG. 1 shows a single server system 130 including the storage device 132 and the bitrate selection module 131, the system architecture 100 may be a distributed computing system. For example, the storage device 132 and the bitrate selection module 131 may be included within different server systems as opposed to a single server system 130.

Figure 2:
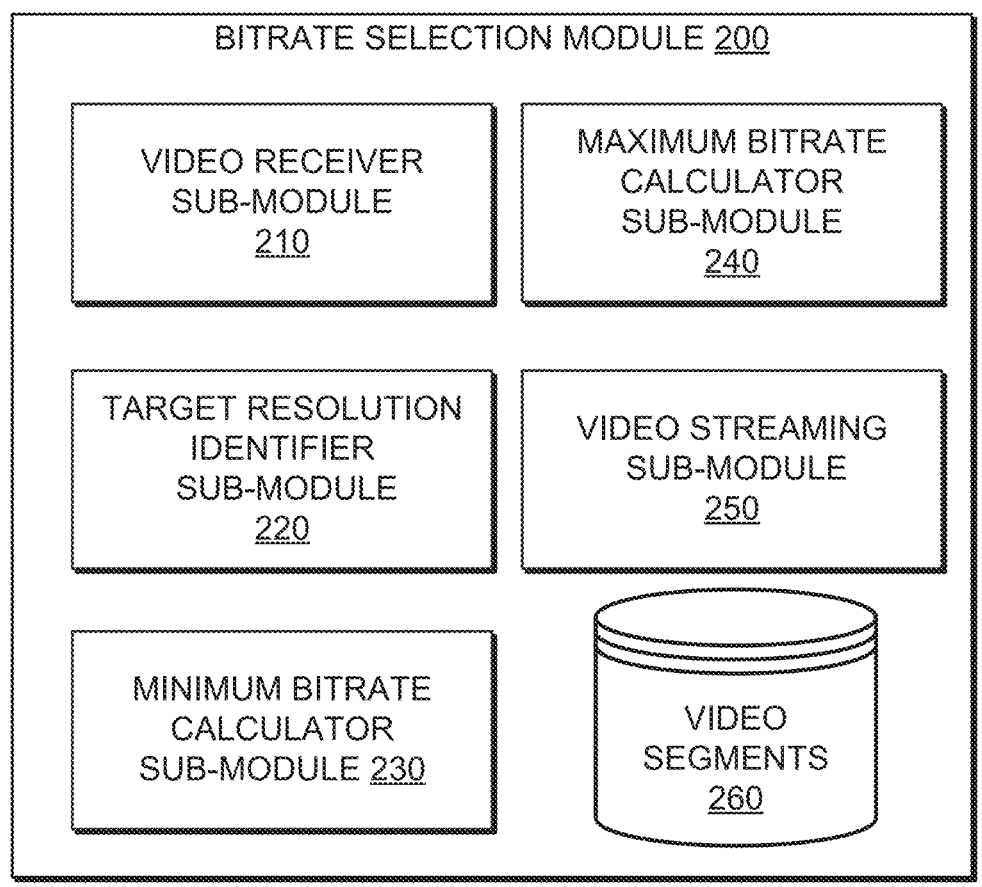
FIG. 2 illustrates an example bitrate selection module in accordance with some embodiments of the disclosure.

FIG. 2 illustrates an example bitrate selection module 200 in accordance with some embodiments of the disclosure. In general, the bitrate selection module 200 may correspond to the bitrate selection module 131 of a server system 130 as shown in FIG. 1. The bitrate selection module 200 may include a video receiver sub-module 210, a target resolution identifier sub-module 220, a minimum bitrate calculator sub-module 230, a maximum bitrate calculator sub-module 240, a video streaming sub-module 250, and a video segments sub-module 260. In alternative embodiments, the functionality of one or more of the sub-modules may be combined or divided.

As shown in FIG. 2, the bitrate selection module 200 may include a video receiver sub-module 210. In some embodiments, the video receiver sub-module 210 may receive multiple videos (i.e., a corpus or library or videos). For example, the videos received by the video receiver sub-module 210 may be videos intended to be transmitted or streamed to one or more client devices. Furthermore, the videos received by the video receiver sub-module 210 may be used to determine or calculate a minimum bitrate and a maximum bitrate for target resolutions of videos to be transmitted or streamed to client devices. The bitrate selection module 200 may further include a target resolution identifier sub-module 220. In some embodiments, the target resolution identifier sub-module 220 may identify target bitrates for the videos received by the video receiver sub-module 210. For example, the target resolution identifier sub-module 220 may identify the resolutions that are available from the received videos. Examples of video resolutions include, but are not limited to, 360p, 480p, 720p, and 1080p.

Returning to FIG. 2, the bitrate selection module 200 may further include a minimum bitrate calculator sub-module 230 and a maximum bitrate calculator sub-module 240. In some embodiments, the minimum bitrate calculator sub-module 230 may calculate or determine a minimum bitrate for each resolution of the videos. Similarly, the maximum bitrate calculator sub-module 240 may calculate or determine a maximum bitrate for each resolution of the videos. For example, the minimum bitrate calculator sub-module 230 and the maximum bitrate calculator sub-module 240 may determine the minimum and maximum bitrates for the resolutions identified by the target resolution identifier sub-module 220 of the videos received by the video receiver sub-module 210. Further details with regard to the calculation of the minimum bitrate are disclosed with regard to FIGS. 4-5B. Additional details with regard to the calculation of the maximum bitrate are disclosed with regard to FIGS. 6-7C.

The bitrate selection module 200 may further include a video streaming sub-module 250. In some embodiments, the video streaming sub-module 250 may transmit or stream one or more videos to one or more client devices. For example, the video streaming sub-module 250 may transmit or stream segments of a video to a client device. Furthermore, the video streaming sub-module 250 may transmit or stream the one or more videos based on the minimum bitrate calculated by the minimum bitrate calculator sub-module 230 and the maximum bitrate calculated by the maximum bitrate calculator sub-module 240. For example, an achievable bitrate associated with a client device may be identified and a video or a segment of a video may be transmitted or streamed to the client based on the achievable bitrate of the client device and the minimum and maximum bitrates identified for the resolutions of the video. Furthermore, the bitrate selection module 200 may include a video segments sub-module 260. In some embodiments, the video segments sub-module 260 may store multiple segments of multiple resolutions of multiple videos.

Figure 3:
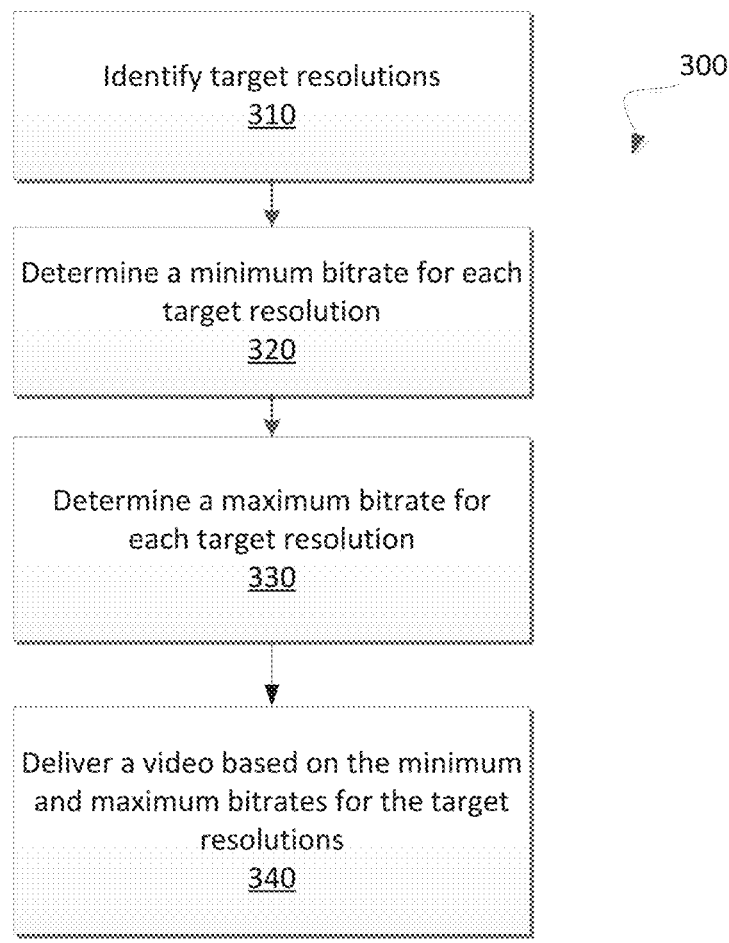
FIG. 3 is a flow diagram of an example method deliver or stream a video based on minimum and maximum bitrates in accordance with some embodiments.

FIG. 3 is a flow diagram of an example method 300 to transmit or stream a video based on minimum and maximum bitrates. In general, the method 300 may be performed by processing logic that may comprise hardware (e.g., processing device, circuitry, dedicated logic, programmable logic, microcode, etc.), software (e.g., instructions run on a processing device), or a combination thereof. In some embodiments, the method 300 may be performed by a bitrate selection module 131 of FIG. 1 or a bitrate selection module 200 of FIG. 2.

As shown in FIG. 3, the method 300 may begin by the processing logic identifying target resolutions (block 310). For example, a set of videos may be received and the target resolutions for each video may be identified. As an example, 5000 videos may be received and three target resolutions (e.g., 480p, 720p, and 1080p) may be identified as available resolutions for each source video. Furthermore, the processing logic may determine a minimum bitrate for each target resolution (block 320). For example, a minimum bitrate may be determined or calculated for each of the 480p, 720p, and 1080p video resolutions. In some embodiments, the minimum bitrate for each target resolution may be calculated or determined based on a crossover point ($B_c$) of the target resolutions. In the same or alternative embodiments, the crossover point may be determined based on a cumulative distribution associated with the videos (e.g., the 5000 videos). Further details with regard to the calculation of the crossover point from a cumulative distribution are disclosed in further detail below with regard to FIGS. 4-5B. The processing logic may further determine a maximum bitrate for each target resolution (block 330). For example, a maximum bitrate may be determined or calculated for each of the 480p, 720p, and 1080p video resolutions. In some embodiments, the maximum bitrate for each target resolution may be calculated or determined based on a point of diminishing return ($B_d$) of the target resolutions. In the same or alternative embodiments, the point of diminishing return may be based on a cumulative distribution associated with the videos. Further details with regard to the calculation of the point of diminishing return from a cumulative distribution are disclosed in further detail below with regard to FIGS. 6-7C. The processing logic may further deliver or stream a video based on the minimum bitrates and maximum bitrates for the target resolutions (block 340). For example, a video at a target resolution may be provided to a client device based on the capabilities (e.g., CPU and bandwidth) of the client device. In some embodiments, the capabilities of the client device may determine the bitrate that the client device is capable of achieving. The delivering or streaming of the video may be based on the bitrate that the client device capabilities is capable of achieving. For example, a video at a particular resolution may be transmitted or streamed to the client device based on an achievable bitrate of the client device and the identified minimum and maximum bitrates of the resolutions.

As an example, a client device may request a video stream associated with a first resolution (e.g., 1080p). The client device may be capable of a first bitrate (e.g., the bandwidth of a network path or connection associated with the client device). The video may be delivered based on the requested resolution of a video player of a client device (e.g., the 1080p) and the bitrate achievable by the client device (e.g., the first bitrate). In some embodiments, the video that is streamed to the client device may be a 1080p resolution of the video. However, in alternative circumstances, the achievable bitrate by the client device may be considered to be too low and the video that is streamed to the client device may be a 720p resolution that is upscaled to a 1080p video on a video player of the client device. In some embodiments, upscaling a video may refer to converting video data from one display resolution to another display resolution. Generally, upscaling may refer to the conversion of video data from a lower resolution to a higher resolution.

As such, a minimum and maximum bitrates for video resolutions may be identified. A client device may request a video at a first video resolution. In response to an achievable bitrate of the client device and the minimum and maximum bitrates for the video resolutions, the video may be delivered or streamed to the client device based on the first video resolution or based on a second video resolution that may be upscaled to the first video resolution at the client device.

Figure 4:
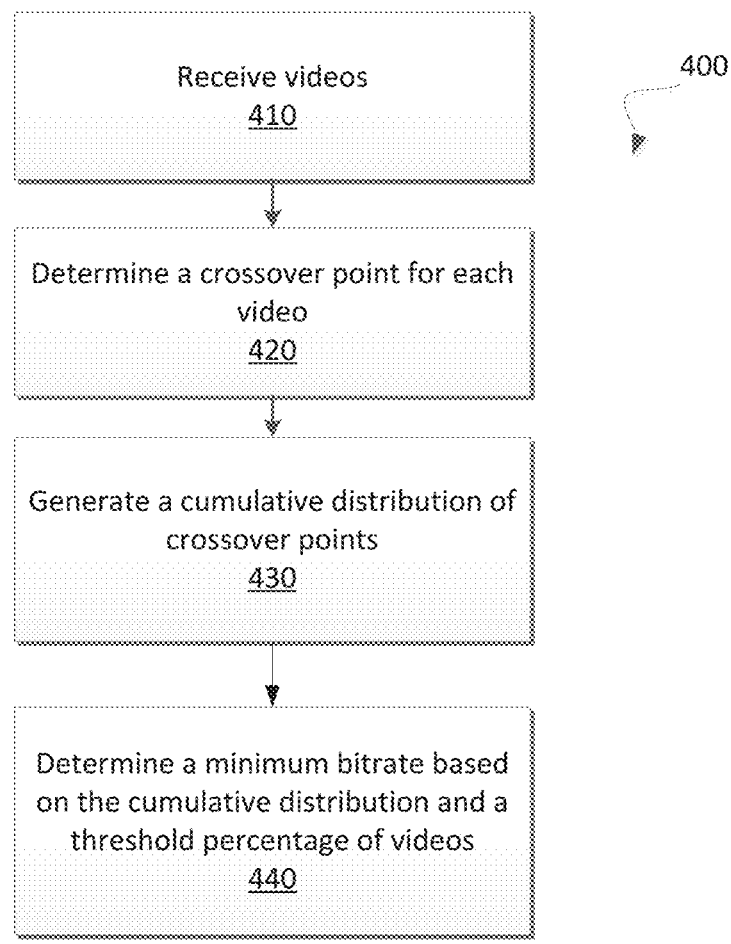
FIG. 4 is a flow diagram of an example method to determine a minimum bitrate for a target resolution in accordance with some embodiments.

FIG. 4 is a flow diagram of an example method 400 to determine a minimum bitrate for a target resolution. In general, the method 400 may be performed by processing logic that may comprise hardware (e.g., processing device, circuitry, dedicated logic, programmable logic, microcode, etc.), software (e.g., instructions run on a processing device), or a combination thereof. In some embodiments, the method 400 may be performed by a bitrate selection module 131 of FIG. 1 or a bitrate selection module 200 of FIG. 2.

As shown in FIG. 4, the method 400 may begin by the processing logic receiving videos (block 410). For example, a set of videos to be processed to identify a minimum bitrate and a maximum bitrate to be used for target resolutions may be received. Furthermore, the processing logic may determine a crossover point for each of the received videos at multiple resolutions. In some embodiments, a crossover point may refer to a bitrate where it is better to transcode a video that is to be transmitted or streamed to a smaller resolution and subsequently upscaling the video at a video player of the client device as opposed to transmitting or streaming the video at the larger resolution.

Figure 5A:
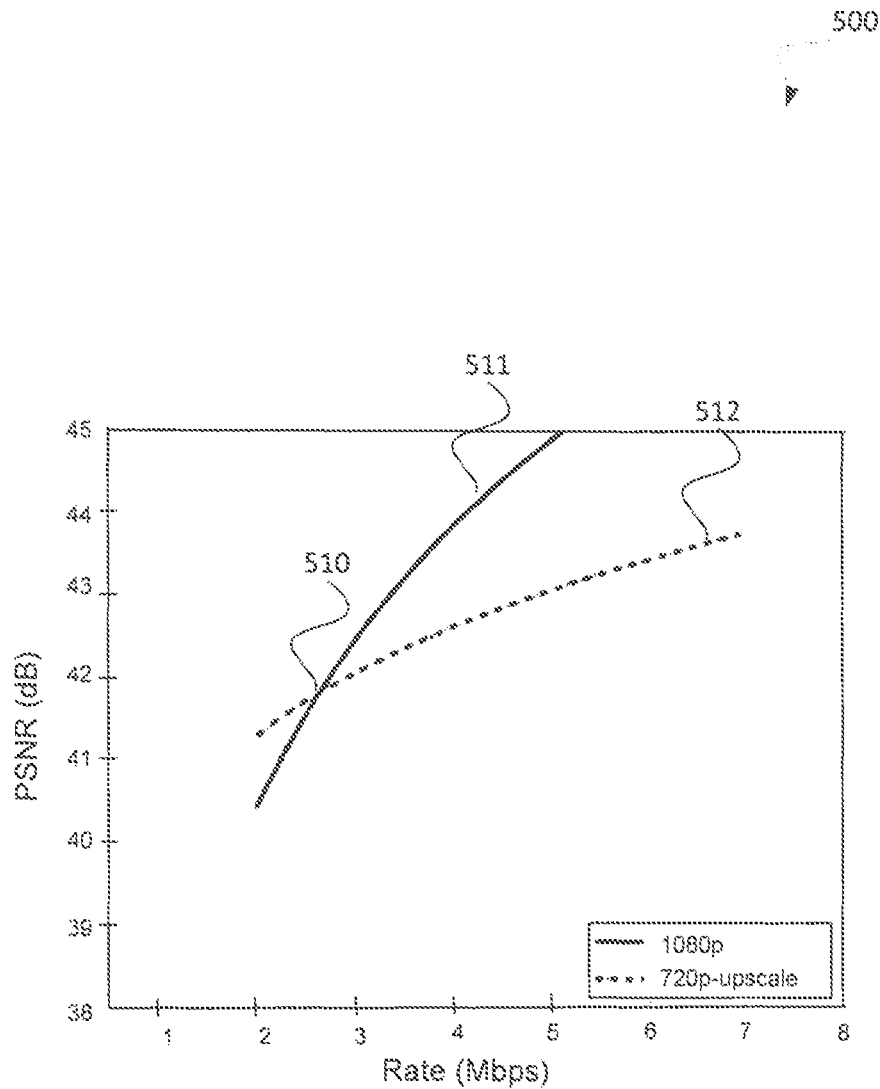
FIG. 5A illustrates a graph to show a crossover point between encodings of a video in accordance with some embodiments.

For example, below a certain bitrate, transcoding a video to the smaller resolution (e.g., 720p) and upscaling the video to the target resolution (e.g., 1080p) requested by a client device) may yield a higher quality video for the client device as opposed to transcoding the same video to the target resolution (e.g., 1080p) at the same bitrate. FIG. 5A illustrates a graph 500 to show a crossover point between encodings or resolutions of a video. As shown, the graph 500 may be considered a Quality Curve as the graph 500 may illustrate video quality in terms of peak signal to noise ratio (PSNR) (e.g., the y-axis) as the bitrate increases (e.g., the x-axis). In some embodiments, PSNR may refer to the ratio between the maximum possible power of a signal and the power of corrupting noise that may impact the fidelity of the representation of a corresponding video. For example, the signal may be the original video data and the corrupting noise may be the error introduced by compressing the original video data. Although the disclosure herein refers to PSNR as a measure of quality, any measure of quality may be used to construct the Quality Curves. Examples of such measures of quality include, but are not limited to, structural similarity (SSIM), video quality metric (VQM), and Motion-based Video Integrity Evaluation (MOVIE).

Returning to FIG. 5A, the quality curve 511 may represent a video at a first resolution at 1080p and the quality curve 512 may represent the same video at a second resolution 720p that is upscaled at a client device. For the video, the quality curve 511 intersects with the quality curve 512 at a point 510 that may be referred to as the crossover point ($B_c$). To the left of the crossover point, the PSNR of the video at the first resolution that is lower than the PSNR of the video at the second resolution of 720p that has been upscaled to 1080p. Thus, in this example, at a bitrate below the bitrate identified by the crossover point, the transmitting of the video at the second resolution of 720p to be upscaled to 1080p at the client device may result in a better quality (e.g., higher PSNR) as opposed to transmitting of the video at the first resolution of 1080p. Thus, the crossover point may be considered to determine a bitrate threshold where bitrates (e.g., achievable bitrates for a client device) below the bitrate threshold identified by the crossover point may result in better quality when transmitting or streaming of the video at a lower resolution to be upscaled to a higher resolution at the client device. Furthermore, if a client device is associated with an achievable bitrates above the bitrate threshold identified by the crossover point, then a better quality video may be received when transmitting or streaming the video at the higher resolution as opposed to the upscaling of a lower resolution.

In some embodiments, the crossover point ($B_c$) for two resolutions of a video may be calculated based on the following equation:

$$B_c = \frac{\ln(\sigma_d^2) - \ln(\sigma_u^2)}{\gamma_d - \gamma_u}$$

In some embodiments, $\sigma_d^2$ and $\sigma_u^2$ may be video pixel variances of the directly transcoded video (e.g., the video at the higher resolution) and the upscaled video, and $\sigma_d$ and $\sigma_u$ may be the Quality Curve constants for direct and upscale of a corresponding video.

Figure 5B:
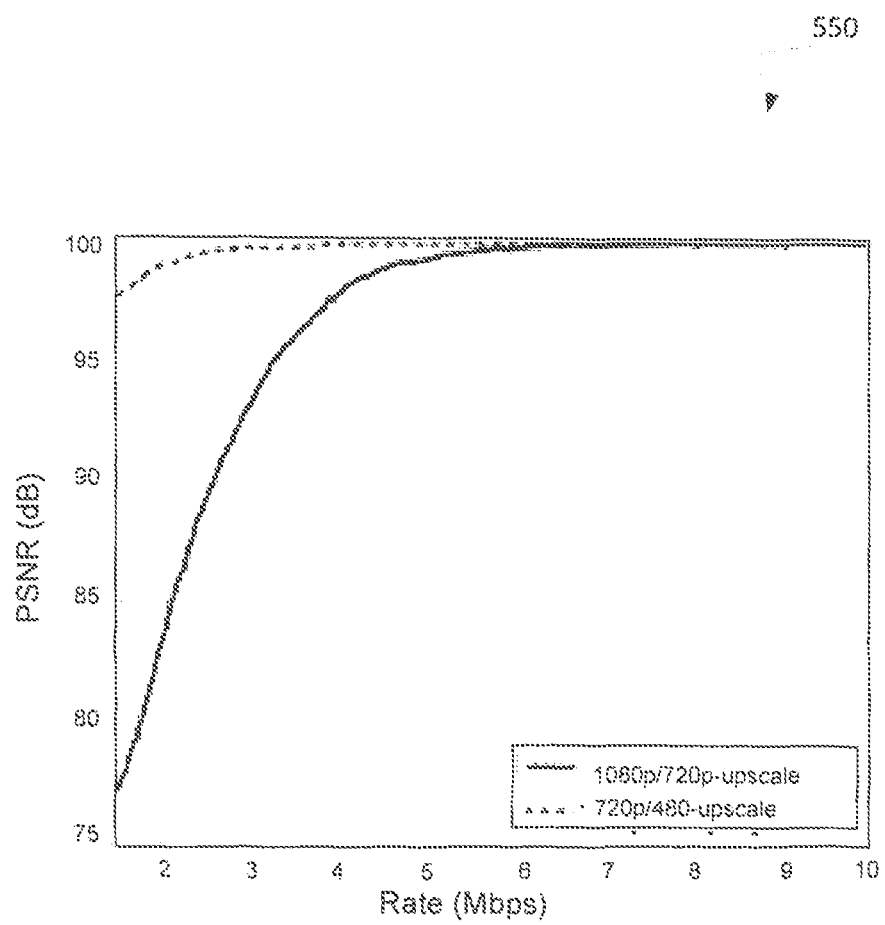
FIG. 5B illustrates a graph to show a cumulative distribution of crossover points of videos in accordance with some embodiments.

Thus, a crossover point may be identified for each target resolution for each video. For example, for each pair of resolutions (e.g., each first higher resolution and a second lower resolution upscaled to the first resolution) of each video, the crossover point may be identified. Thus, multiple crossover points may be identified. Returning to FIG. 4, a cumulative distribution of the crossover points for each video may be generated (block 430). In some embodiments, the cumulative distribution of the crossover points may be based on an identified crossover point for a pair of resolutions for multiple videos. FIG. 5B illustrates a graph 550 to show an example cumulative distribution of crossover points of videos. In general, the y-axis may represent a percentage or number of videos and the x-axis may represent a bitrate. The cumulative distribution may represent a number or percentage of videos that have a crossover point at a bitrate identified by the x-axis. For example, at a first bitrate value, a first percentage of videos may have a crossover point equal to or less than the first bitrate value. At a second bitrate value that is higher than the first bitrate value, a second percentage of videos may have a crossover point that is equal to or less than the second bitrate value. As shown, the graph 550 illustrates that encoding a video to 1080p (e.g., a higher resolution) may result in better quality than upscaling a lower resolution (e.g., 720p) for 96.5% of the videos. At a bitrate of 4.55 Mbps, encoding the video to 1080p may result in better quality than upscaling a lower resolution of 720P to 1080p for 99% of the videos. Thus, in this example, the minimum target bitrate for the higher resolution of 1080p may be selected to be 4.55 Mbps.

Returning to FIG. 4, the processing logic may determine a minimum bitrate based on the cumulative distribution of the crossover points and a threshold percentage or number of videos (block 440). For example, the minimum bitrate for a target resolution may be identified by identifying a threshold percentage of videos (e.g., identified by the y-axis of the graph 550) and identifying the crossover point (e.g., identified by the x-axis of the graph 550) corresponding to the threshold percentage of videos (e.g., 96.5%). Thus, the minimum bitrate may be the cumulative crossover point of a threshold number or percentage of videos. For example, referring to graph 550, if the threshold percentage of videos is set at a threshold value, the bitrate as identified by the x-axis for the threshold value as identified by the y-axis may be determined (e.g., the bitrate as identified by the cumulative crossover point for 96.5% of the videos).

Figure 6:
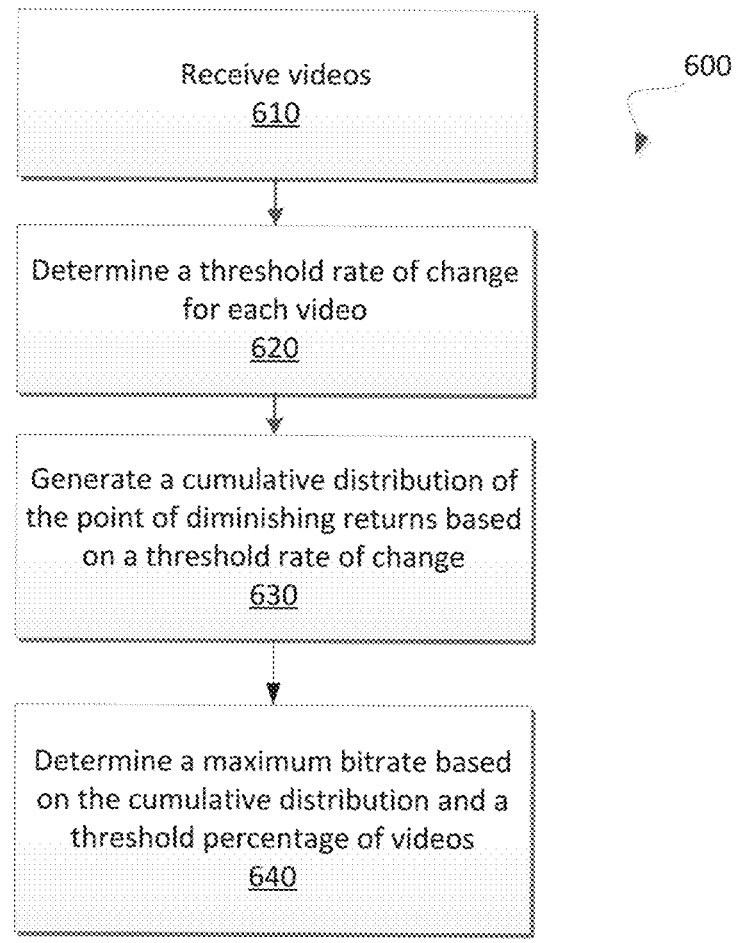
FIG. 6 is flow diagram of an example method to determine a maximum bitrate for a target resolution in accordance with some embodiments of the disclosure.

FIG. 6 is flow diagram of an example method 600 to determine a maximum bitrate for a target resolution. In general, the method 600 may be performed by processing logic that may comprise hardware (e.g., processing device, circuitry, dedicated logic, programmable logic, microcode, etc.), software (e.g., instructions run on a processing device), or a combination thereof. In some embodiments, the method 600 may be performed by a bitrate selection module 131 of FIG. 1 or a bitrate selection module 200 of FIG. 2.

As shown in FIG. 6, the method 600 may begin by the processing logic receiving videos (block 610). For example, the set of videos where the minimum bitrate is identified may be received. Furthermore, the processing logic may determine a threshold rate of change ($\theta_d$) for each of the received videos (block 620). In some embodiments, a point of diminishing return ($B_d$) may refer to a bitrate where increasing the bitrate further may have little or no effect on improving video quality. Furthermore, the point of diminishing return may be determined based on the threshold rate of change (e.g., a rate of quality change).

As discussed, the point of diminishing return may be determined or set based on a threshold ($\theta_d$) on the rate of quality change from a Quality Curve (e.g., the rate of change of PSNR) as illustrated in the following example equation:

$$\frac{d}{dr}Q \le \theta_d$$

Figure 7A:
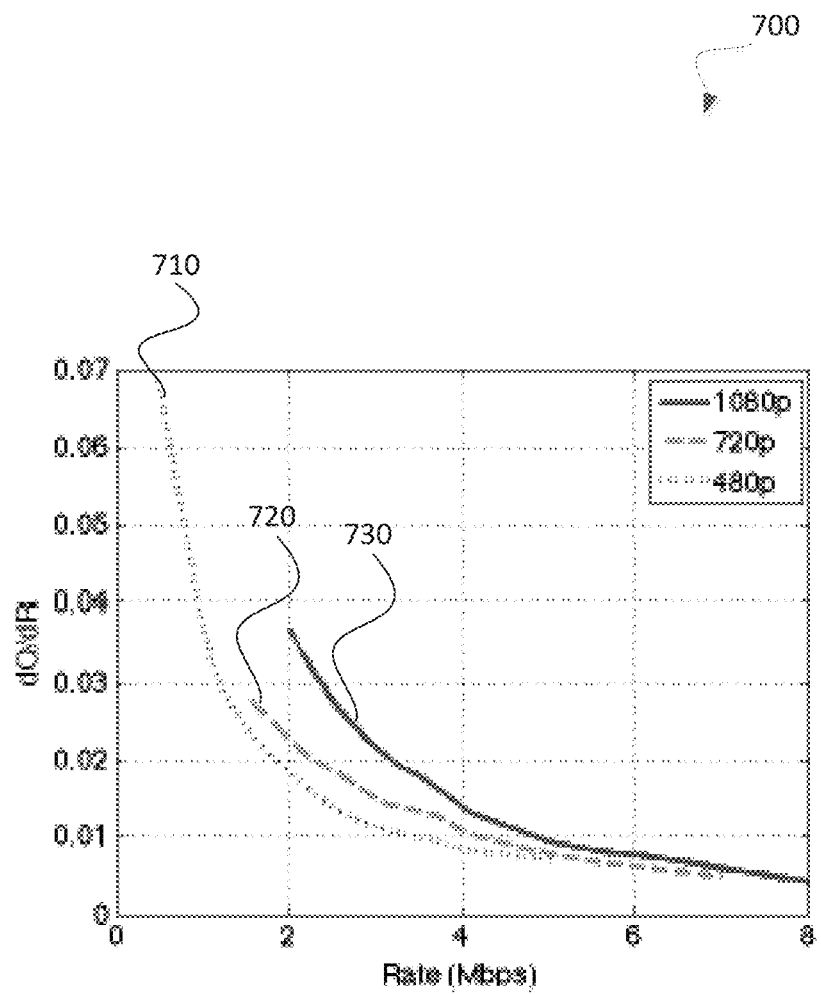
FIG. 7A illustrates a graph to show a threshold rate of change in accordance with some embodiments.
Figure 7B:
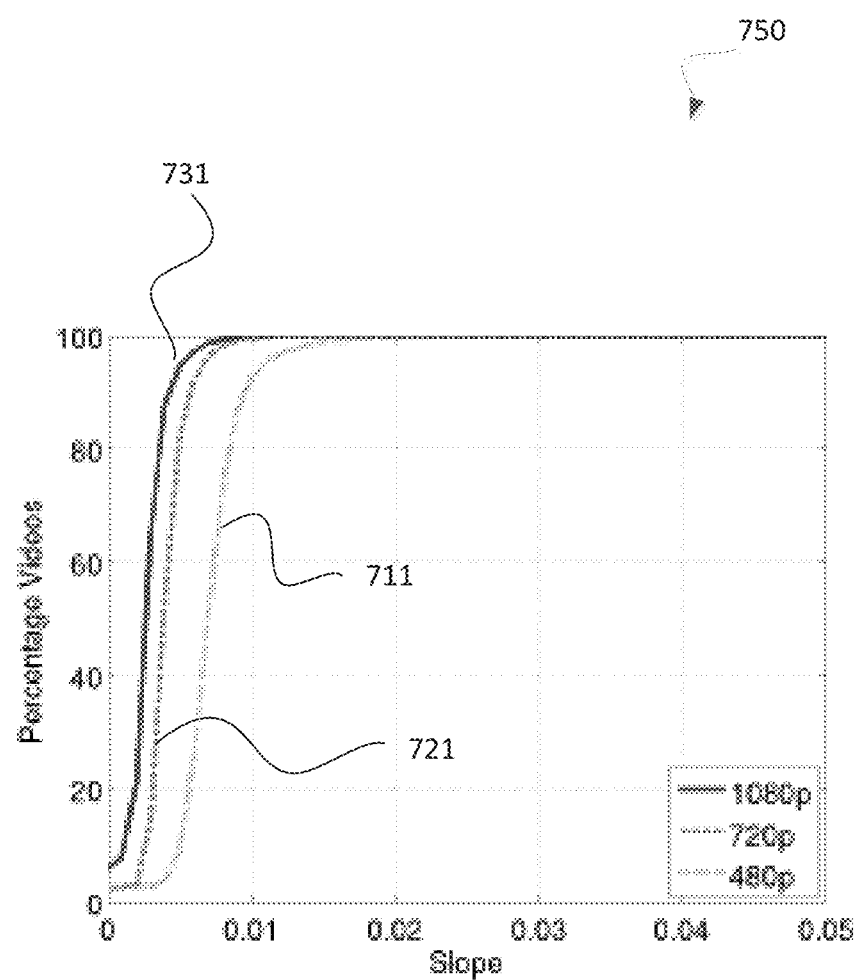
FIG. 7B illustrates a graph to show a cumulative distribution of the rate of change in accordance with some embodiments.

FIG. 7A illustrates an example graph 700 to show a threshold rate of change ($\theta_d$). As shown, the y-axis may represent a rate of change with respect to quality of a video (e.g., PSNR) and the x-axis may represent a bitrate. The graph 700 further illustrates a curve 710 corresponding to a 480p resolution of a video, a curve 720 corresponding to a 720p resolution of the video, and a curve 730 corresponding to a 1080p resolution of the video. As shown, the rate of quality change (e.g., the y-axis) for the curves 710, 720, and 730 as the bitrate (e.g., the x-axis) increases is smaller as the bitrate increases. At a certain threshold value or point, the rate of quality change may be considered to be insignificant as the bitrate increases. For example, in some embodiments, the threshold rate of change may be 0.01 (e.g., the rate of change of the quality of the video does not significantly improve after this point in response to an increased bitrate). However, the threshold rate of change may be different for other videos. Furthermore, FIG. 7B illustrates a graph 750 to show an example cumulative distribution of the rate of change. As shown, the graph 750 may show a cumulative distribution of the rate of change when the point of diminishing return is at or below a maximum bitrate. The graph 750 further shows a curve 711 representing a 480p resolution of a video, a curve 721 representing a 720p resolution of the video, and a curve 731 representing a 1080p resolution of the video. As illustrated, the curve 731 representing the 1080p resolution of the video, the graph 750 shows that at a maximum target bitrate (e.g., 8 Mbps), 99.9% of the videos satisfied the threshold rate of change of 0.01. Similarly, for the curve 721 representing the 720p resolution of the video at a maximum target bitrate (e.g., 6 Mbps), 99.5% of the videos may satisfy the threshold rate of change of 0.01 and for the curve 711 representing the 480p resolution at a maximum target bitrate (e.g., 5 Mbps), 95% of the videos satisfied the threshold rate of change of 0.01. These results may indicate a high level of confidence that a threshold rate of change of 0.01 is reasonable and may be used to calculate the point of diminishing return for each target resolution.

Figure 7C:
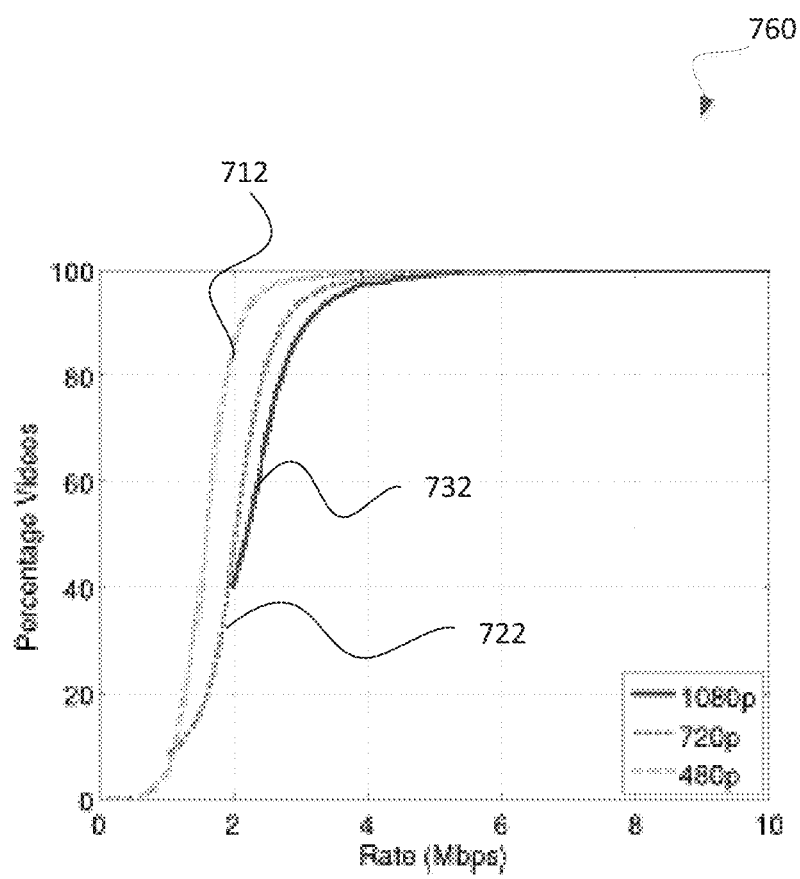
FIG. 7C illustrates a graph to show a cumulative point of diminishing return based on the threshold rate of change in accordance with some embodiments.

Returning to FIG. 6, the processing logic may generate a cumulative distribution of the point of diminishing return based on a threshold rate of change (block 630) and the processing logic may further determine a maximum bitrate based on the cumulative distribution and a threshold percentage or number of videos (block 640). For example, as shown in FIG. 7C, a graph 760 may show a cumulative point of diminishing return based on the threshold rate of change. For example, the graph 760 may illustrate the point of diminishing return when the threshold rate of change is set to 0.01. As shown, the number or percentage of videos (e.g., the y-axis) may be determined when the point of diminishing return is equal to or less than the given bitrate (e.g., the x-axis). Furthermore, the graph 760 shows a curve 712 representing a 480p resolution of a video, a curve 722 representing a 720p resolution of the video, and a curve 732 representing a 1080p resolution of the video. As shown, for the curve 732 representing the 1080p resolution of the video, 98% of the videos may reach the point of diminishing return at a bitrate of 4.8 Mbps when the threshold rate of change is set at 0.01. Similarly, for the curve 722 representing the 720p resolution of the video, the point of diminishing return may be at a bitrate of 4.1 Mbps for 98% of the videos, and for the curve 712 representing the 480 resolution of the video, the point of diminishing return may be reached at a bitrate of 3.1 Mbps. Thus, in this example, the maximum target bitrate for a 1080p resolution may be set to 4.8 Mbps, the maximum target bitrate for the 720p resolution may be set to 4.1 Mbps, and the maximum target bitrate for the 480p resolution may be set to 3.1 Mbps.

As such, minimum and maximum bitrates may be identified for each target resolution. For example, a first bitrate range from a first minimum bitrate and a first maximum bitrate may be identified for a first video resolution. A second bitrate range from a second minimum bitrate and a second maximum bitrate may be identified for a second video resolution. Thus, each resolution may be associated with a bitrate range. A client device may request a video to be streamed. The capabilities of the client device may be identified and the achievable bitrate of the client device may be determined. The resolution of the requested video may be streamed to the client device based on the achievable bitrate of the client device and the first bitrate range and the second bitrate range. For example, if the achievable bitrate of the client device is within the first bitrate range, then the video may be delivered or streamed at the first video resolution.

Figure 8:
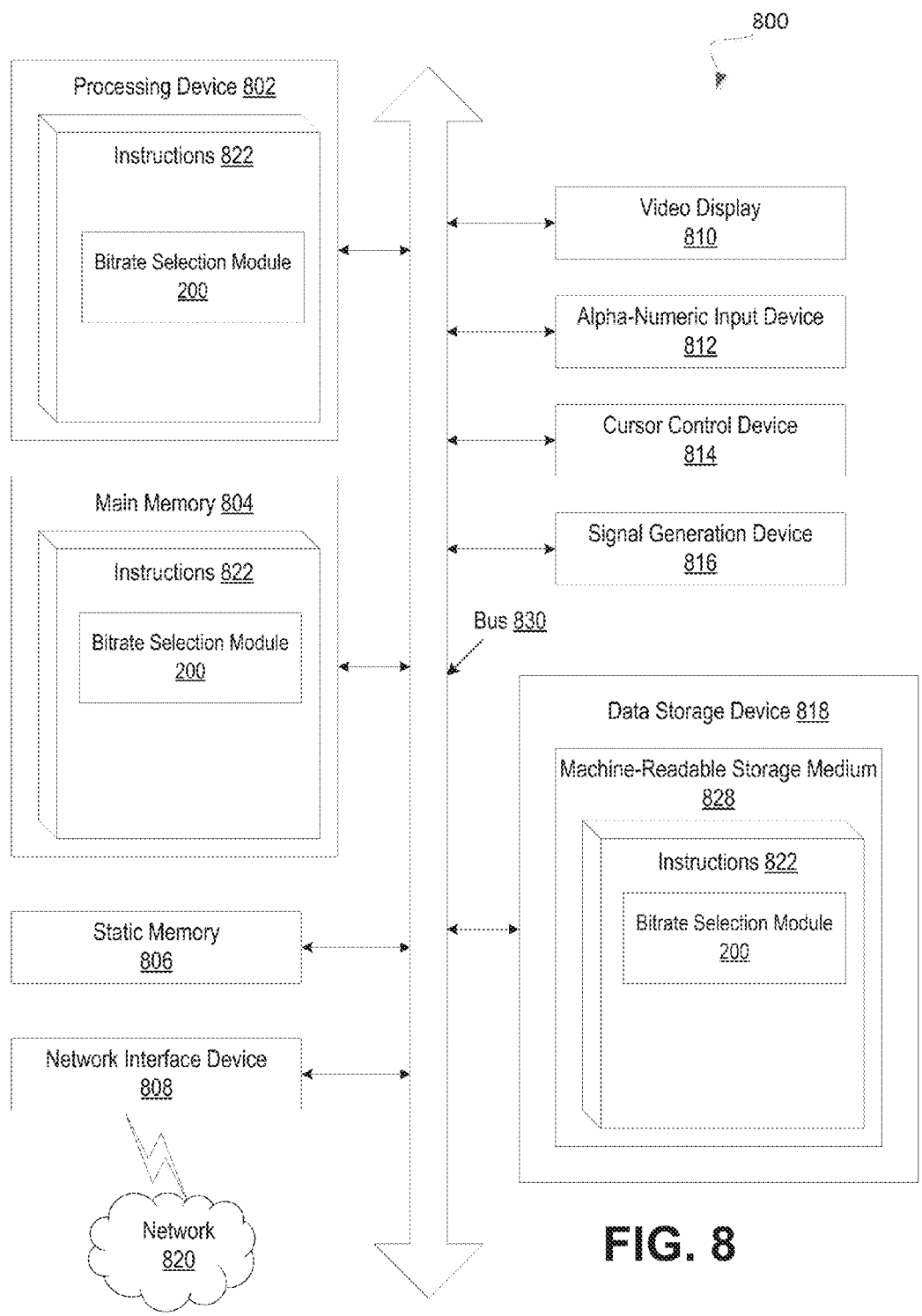
FIG. 8 illustrates a block diagram of an embodiment of a computer system in which some embodiments of the disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or DRAM, etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions or software 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one implementation, the instructions 822 include instructions for a bitrate selection module (e.g., bitrate selection module 200 of FIG. 2) and/or a software library containing methods that call modules or sub-modules in a bitrate selection module. While the machine-readable storage medium 828 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
  receiving a plurality of videos associated with a plurality of video resolutions;
  identifying, by a processing device, a minimum bitrate for each of the video resolutions based on a first bitrate point associated with the videos where a quality of the videos at a first video resolution that is upscaled to a second video resolution is better than a quality of the videos at the second video resolution at bitrates below the first bitrate point, the upscaling of the first video resolution corresponding to converting the videos from the first video resolution to the second video resolution at a client device;
  identifying a maximum bitrate for each of the video resolutions based on a second bitrate point where a rate of change of the quality of the videos is below a threshold value; and
  assigning the identified minimum bitrates and the maximum bitrates to the video resolutions.

2. The method of claim 1, wherein the identifying of the minimum bitrate for each of the video resolutions is further based on a cumulative distribution associated with the first bitrate point of each of the videos, and wherein the identifying of the maximum bitrate for each of the video resolutions is further based on a cumulative distribution associated with the threshold value of each of the videos.

3. The method of claim 1, further comprising:
  receiving, from the client device, a request for one of the videos;
  identifying an achievable bitrate associated with the client device; and
  transmitting a transcoding of the requested video based on the achievable bitrate of the client device and the minimum bitrate and maximum bitrate for one of the video resolutions.

4. The method of claim 3, wherein the achievable bitrate of the client device is between the minimum bitrate and the maximum bitrate for the one of the video resolutions and the achievable bitrate is based on video processing and bandwidth capabilities associated with the client device.

5. The method of claim 3, wherein the transmitting of the requested video based on the achievable bitrate of the client device and the minimum bitrate and the maximum bitrate for one of the video resolutions comprises identifying the transcoding of the requested video at a particular video resolution associated with the minimum bitrate and the maximum bitrate.

6. The method of claim 3, further comprising:
  identifying a change in the achievable bitrate associated with the client device; and
  switching the transmitting of the requested video from the transcoding to a second transcoding based on the change in the achievable bitrate of the client device.

7. The method of claim 6, wherein the transcoding of the requested video is at a first bitrate and a first video resolution and the second transcoding of the requested video is at a second bitrate and a second video resolution, wherein the first bitrate is different than the second bitrate and the first video resolution is different than the second video resolution.

8. A non-transitory machine-readable storage medium storing instructions which, when executed, cause a processing device to perform operations comprising:
  receiving a plurality of videos associated with a plurality of video resolutions;
  identifying a minimum bitrate for each of the video resolutions based on a first bitrate point associated with the videos where a quality of the videos at a first video resolution that is upscaled to a second video resolution is better than a quality of the videos at the second video resolution at bitrates below the first bitrate point, the upscaling of the first video resolution corresponding to converting the videos from the first video resolution to the second video resolution at a client device;
  identifying a maximum bitrate for each of the video resolutions based on a second bitrate point where a rate of change of the quality of the videos is below a threshold value; and
  assigning the identified minimum bitrates and the maximum bitrates to the video resolutions.

9. The non-transitory machine-readable storage medium of claim 8, wherein the identifying of the minimum bitrate for each of the video resolutions is further based on a cumulative distribution associated with the first bitrate point of each of the videos, and wherein the identifying of the maximum bitrate for each of the video resolutions is further based on a cumulative distribution associated with the threshold value of each of the videos.

10. The non-transitory machine-readable storage medium of claim 8, wherein the operations further comprise:

receiving, from the client device, a request for one of the videos;

identifying an achievable bitrate associated with the client device; and transmitting a transcoding of the requested video based on the achievable bitrate of the client device and the minimum bitrate and maximum bitrate for one of the video resolutions.

11. The non-transitory machine-readable storage medium of claim 10, wherein the achievable bitrate of the client device is between the minimum bitrate and the maximum bitrate for the one of the video resolutions and the achievable bitrate is based on video processing and bandwidth capabilities associated with the client device.

12. The non-transitory machine-readable storage medium of claim 10, wherein the transmitting of the requested video based on the achievable bitrate of the client device and the minimum bitrate and the maximum bitrate for one of the video resolutions comprises identifying the transcoding of the requested video at a particular video resolution associated with the minimum bitrate and the maximum bitrate.

13. The non-transitory machine-readable storage medium of claim 10, the operations further comprising:

identifying a change in the achievable bitrate associated with the client device; and switching the transmitting of the requested video from the transcoding to a second transcoding based on the change in the achievable bitrate of the client device.

14. The non-transitory machine-readable storage medium of claim 13, wherein the transcoding of the requested video is at a first bitrate and a first video resolution and the second transcoding of the requested video is at a second bitrate and a second video resolution, wherein the first bitrate is different than the second bitrate and the first video resolution is different than the second video resolution.

15. A system comprising:

a memory; and a processor coupled with the memory and to:

identify a plurality of videos;

identifying a plurality of target video resolutions associated with the videos;

identify a minimum bitrate for each of the target video resolutions based on a crossover point associated with the videos, wherein the crossover point is defined by a bitrate value where a quality of the videos at a first target video resolution that is upscaled to a second target video resolution is improved over a quality of the videos at the second target video resolution at bitrates below the bitrate value that defines the crossover point,
the upscaling of the first target video resolution corresponding to converting the videos from the first target video resolution to the second target video resolution at a client device;

identify a maximum bitrate for each of the target video resolutions based on a point of diminishing return that is defined by a second bitrate value where a rate of change of improving quality of the videos is below a threshold value; and assign the identified minimum bitrates and the maximum bitrates to the target video resolutions.

16. The system of claim 15, wherein the identifying of the minimum bitrate for each of the target video resolutions is further based on a cumulative distribution associated with the crossover point of each of the videos, and wherein the identifying of the maximum bitrate for each of the target video resolutions is further based on a cumulative distribution associated with the threshold value of each of the videos.

17. The system of claim 15, wherein the processor is further to:

receive, from the client device, a request for one of the videos;

identify an achievable bitrate associated with the client device; and transmit a transcoding of the requested video based on the achievable bitrate of the client device and the minimum bitrate and maximum bitrate for one of the target video resolutions.

18. The system of claim 17, wherein the achievable bitrate of the client device is between the minimum bitrate and the maximum bitrate for the one of the target video resolutions and the achievable bitrate is based on video processing and bandwidth capabilities associated with the client device.

19. The system of claim 17, wherein the transmitting of the requested video based on the achievable bitrate of the client device and the minimum bitrate and maximum bitrate for one of the target video resolutions comprises identifying the transcoding of the requested video at a particular target video resolution associated with the minimum bitrate and the maximum bitrate.

20. The system of claim 17, wherein the processor is further to:

identify a change in the achievable bitrate associated with the client device; and switch the transmitting of the requested video from the transcoding to a second transcoding based on the change in the achievable bitrate of the client device.

* * * * *